May 19, 1959 — N. MORANO ET AL — 2,887,672
DUMP BODY WARNING SIGNAL
Filed April 28, 1958
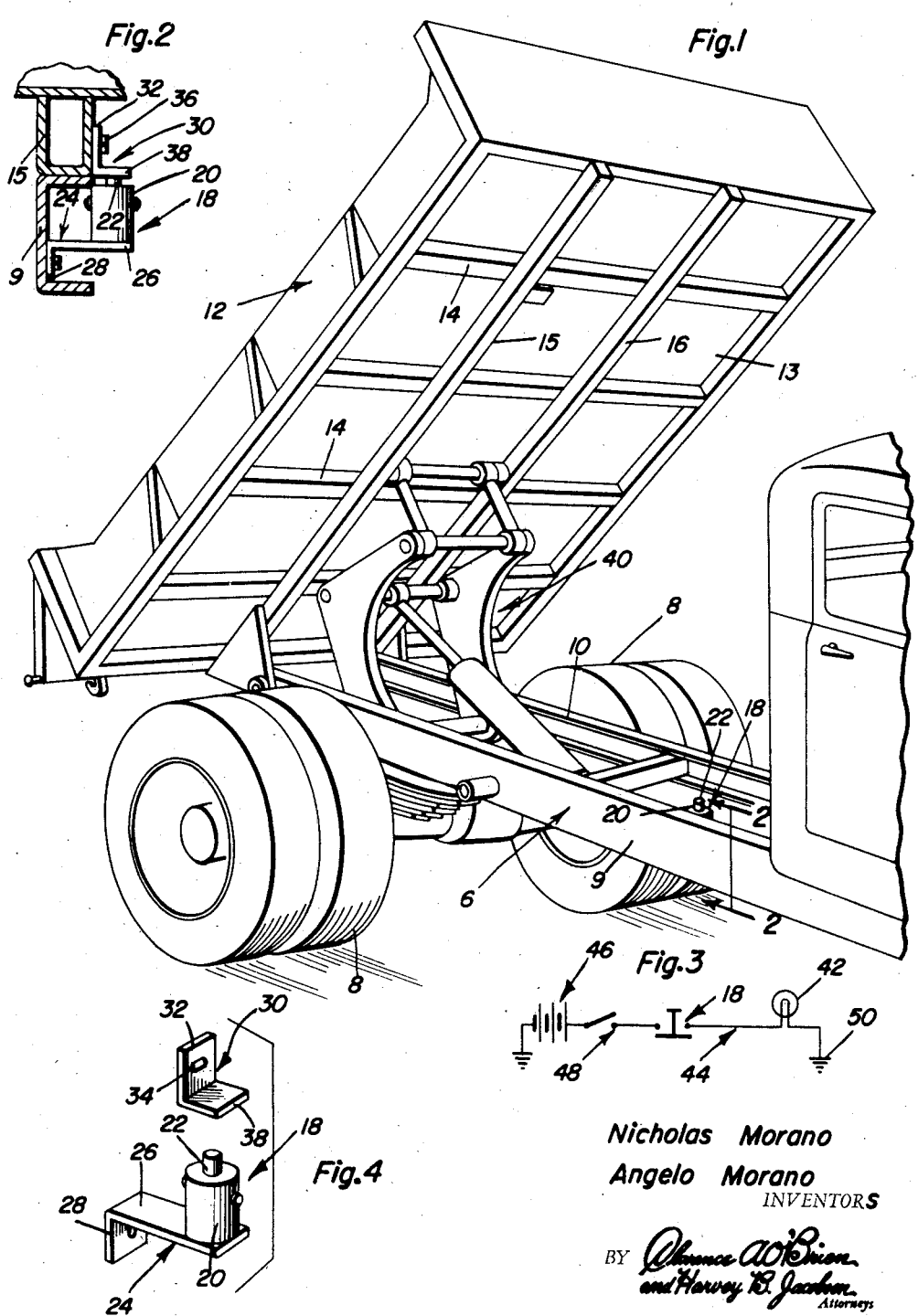
Nicholas Morano
Angelo Morano
INVENTORS

United States Patent Office 2,887,672
Patented May 19, 1959

2,887,672

DUMP BODY WARNING SIGNAL

Nicholas Morano and Angelo Morano, Ardsley, N.Y.

Application April 28, 1958, Serial No. 731,240

5 Claims. (Cl. 340—52)

The present invention relates to a simple and practical switch and an illuminable warning signal embodied in an equally simple circuit which when properly installed on a dump truck construction functions to provide a warning signal which is indicative of the raised and lowered positions of the dump body.

The purpose of the invention is to provide the driver or operator of the truck with a warning signal on the instrument panel enabling him to ascertain at a glance whether the dump body is in its normal lowered carrying position while the load is in transit. It happens not infrequently that while a dump truck is moving along a highway or elsewhere the catch or retaining means will become accidentally released, allowing the dump body to raise without the knowledge of the operator. If and when this condition arises the load, at least a portion thereof, is undesirably dumped on the road or highway surface; or, where the dump body is not loaded it may swing up and take a damaging angle providing an obstruction that might come into engagement with a bridge, viaduct, overhead wires or similar obstruction resulting in considerable damage and perhaps subjecting the driver to arrest.

Although the above mentioned problem has existed for quite some time, few or no practical solutions have, evidently, been satisfactorily worked out. It follows that the instant concept has to do with effectual and reliable means characterized by the aforementioned body responsive switch which is adapted to come into play and, through the medium of the signalling bulb or lamp, to warn the driver in time to take whatever steps are necessary to return the dump body to its intended horizontal or load carrying position.

Stated briefly and somewhat broadly, novelty is predicated on a wheel supported chassis, an upwardly and rearwardly swingable dump body hingedly mounted for operation on the trailing end of said chassis, means interposed between the adjacent surfaces of the chassis and dump body for lifting and lowering the dump body, a signal circuit off and on switch mounted for operation on a predetermined part of said chassis, said switch being automatically operable and open when the dump body is in its normal horizontal load transporting position, and closing to bring the signal circuit into play promptly if and when the dump body moves upwardly and away from said horizontal position.

In carrying out a preferred embodiment of the invention a simple spring loaded switch, of any suitable construction and having a spring biased plunger is bracketed in the open channel of one of the channel bars of the wheel supported chassis. It is so mounted that the upper end of the plunger when released, as the truck body starts to swing up, extends to a level or position above the topmost flange of the channel bar. A simple but practical angle clip or the like is fastened to one of the longitudinal rails on the underneath side of the dump body and is located so that it functions as a presser foot. Therefore when the dump body is in its down or normal horizontal position the presser foot engages the plunger and opens the switch. Conversely, when the dump body is either accidentally or intentionally released and moved to an elevated position, the switch closes and through a suitably wired circuit illuminates the signalling or warning bulb on the aforementioned instrument panel.

Other objects, features and advantages will become more readily apparent from the following description and drawing.

In the drawing, wherein like numerals are employed to designate like parts throughout the views:

Fig. 1 is a fragmentary perspective view showing a conventional dump truck and illustrating the dump body in its raised or dumping position and exposing the plunger of the aforementioned switch;

Fig. 2 is a section on a suitably enlarged scale which may be said to be taken approximately on the vertical line 2—2 of Fig. 1 looking in the direction of the arrows;

Fig. 3 is a view of the simple wiring diagram; and

Fig. 4 is an exploded perspective view showing the essential components which go to make up a preferred embodiment of the invention or attachment.

With reference to the drawing and particularly to Fig. 1 the wheel supported chassis is denoted generally by the numeral 6, the wheels at 8 and the spaced parallel channel bars at 9 and 10. These bars are differentiated inasmuch as the bracketed switch is to be mounted on the open side of the channel bar 9. The dump body, also conventional, is denoted by the numeral 12 and the bottom is denoted at 13, the crossrails being designated by the numeral 14 and the longitudinal rails by the numerals 15 and 16.

With reference now to Fig. 4 the more or less conventional type spring-loaded or plunger type switch is denoted by the numeral 18 and comprises a cylindrical casing 20 with a spring-pressed or biased plunger 22 which extends up and through an opening in the top of the casing. The contacts and spring means on the interior are not shown inasmuch as this is a type of switch which may be purchased on the open market. In any event there is an adapter bracket of L-shape form 24 having a horizontal lower arm 26 and a vertical short arm 28. As seen in Fig. 2 the short arm is bolted to the web of the channel bar 9 and the long arm is sufficient in length that it extends outwardly beyond the open side of the channel where it positions the vertically disposed switch in a position where it does not interfere with the coming together of the aligned frame members or bars 9 and 15. To accomplish the desired end a simple angle clip 30 is provided and this has a vertical leg 32 (Fig. 4) with a slot 34 which is adjustably and detachably bolted at 36 to one of the side flanges of the bar or rail 15. This puts the clip in a position so that the horizontal outstanding portion 38 becomes a presser foot. Manifestly, the presser foot is in a position in alignment with the plunger so that when it is in the operative position seen in Fig. 2 it depresses the spring-loaded plunger 22 and keeps the switch open. If for some unexplainable reason the hoist means 40 (Fig. 1) comes into play by accidental release of the catch or retainer means (not shown) the weight of the dump body 12 is lifted from the switch and consequently the switch comes automatically into play, closes the circuit and illuminates the signalling or warning bulb or lamp mounted on the instrument panel (not detailed). With reference to Fig. 3 the stated bulb is denoted at 42 and is appropriately included in the circuit 44. The numeral 46 designates the battery, 48 a cutout switch which is optionally usable, 18 the automatic control or responsive switch and 50 denotes the ground.

Inasmuch as the wiring or circuit will be subject to change no special detailing or description thereof is thought to be necessary. This also applied to the signalling bulb 42 since it will be more or less a conventional one and appropriately mounted (not shown) on the instrument panel.

While the essence of the invention is perhaps directed primarily to the readily applicable and removable attachment means of Fig. 4, it will be evident that the combination broadly depicted in Fig. 1 is significant as is the alignment of the frame members 9 and 15 and the offsetting of the switch means as seen in Fig. 2. The claims are being presented accordingly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a dump truck construction, in combination, a wheel-supported chassis, an upwardly and rearwardly swingable dump body hingedly mounted for operation on the trailing end of said chassis, means interposed between the adjacent surfaces of the chassis and dump body for lifting and lowering the dump body, a signal circuit off and on switch mounted for operation on a predetermined part of said chassis, said switch being automatically operable and open when the dump body is in its normal horizontal load transporting position, and closing to bring the signal circuit into play promptly if and when the dump body moves upwardly and away from said horizontal position.

2. The structure defined in claim 1 and wherein said switch is mounted on one of the longitudinal frame members of said chassis, said switch embodying an upstanding spring-loaded plunger, the upper end of which moves to a position above the topmost surface of said one frame member when pressure of an adjacent aligned frame member mounted on the underneath side of said dump body is brought about.

3. In a dump body construction, in combination, a wheel-supported chassis having opposed coplanar frame members with the open sides of the channels thereof opening inwardly and toward each other, a spring-loaded plunger type switch with the plunger extending vertically and, when not under pressure, projecting to a position above the top flange of one of said channel bars, an adapter bracket having one end secured to the channel bar and a horizontal portion extending through and beyond the open side of the channel bar, said switch being mounted on the end portion of said arm in a position clear of the open side of the channel bar itself, a dump body hingedly mounted for operation on the trailing end of the channel bars of the chassis and having a bottom provided with a reinforcing framework including longitudinal frame members, said longitudinal frame members being directly above and movable toward and from the channel bars and, when the dump body is in its horizontal load carrying position resting directly on the top flanges of the channel bars, and a clip detachably and adjustably bolted on an inner flange of one of the frame members, said clip having an outstanding portion constituting a presser foot and said presser foot being in operative alignment with the plunger in a manner to exert pressure on the plunger and to keep the switch in an open position when the presser foot is operable.

4. In combination, a channel bar, a frame member normally resting atop the top flange of the channel bar, an L-shaped adapter bracket having a vertical short arm bolted to the channel bar and a long horizontally disposed arm projecting through and beyond the open side of the channel bar, a spring-loaded plunger type switch supported on the outer end of said horizontal arm in a position approximately clear of the open side of the channel, and an L-shaped clip having vertical and horizontal portions, the vertical portion being bolted on one of the flanges of the frame member and the horizontal portion constituting a presser foot and being adapted to cooperatively engage the upper end of the plunger of said switch.

5. For use in operating a warning signal of an illuminable type which is adapted to be mounted on an instrument panel in the cab of a dump truck, attachment means comprising an L-shaped bracket with a short arm adapted to be fastened on one frame member, and a long horizontally disposed arm adapted to project through and beyond the open side of the frame member, a spring-loaded plunger type circuit closing switch supported perpendicularly on the outer end of the horizontal arm, and an angle clip embodying a vertical portion adapted to be adjustably and detachably bolted on a flange of a frame member arranged directly above the first named frame member and having a horizontal outstanding end portion constituting a presser foot, said foot being aligned with and adapted to cooperate with the plunger of said switch.

References Cited in the file of this patent
UNITED STATES PATENTS

| | | |
|---|---|---|
| 2,508,149 | Eliassen | May 16, 1950 |
| 2,842,633 | Roach | July 8, 1958 |